May 21, 1963 G. X. R. BOUSSU ETAL 3,090,189
ELASTIC WIRE CABLES
Filed Oct. 30, 1957 7 Sheets-Sheet 1
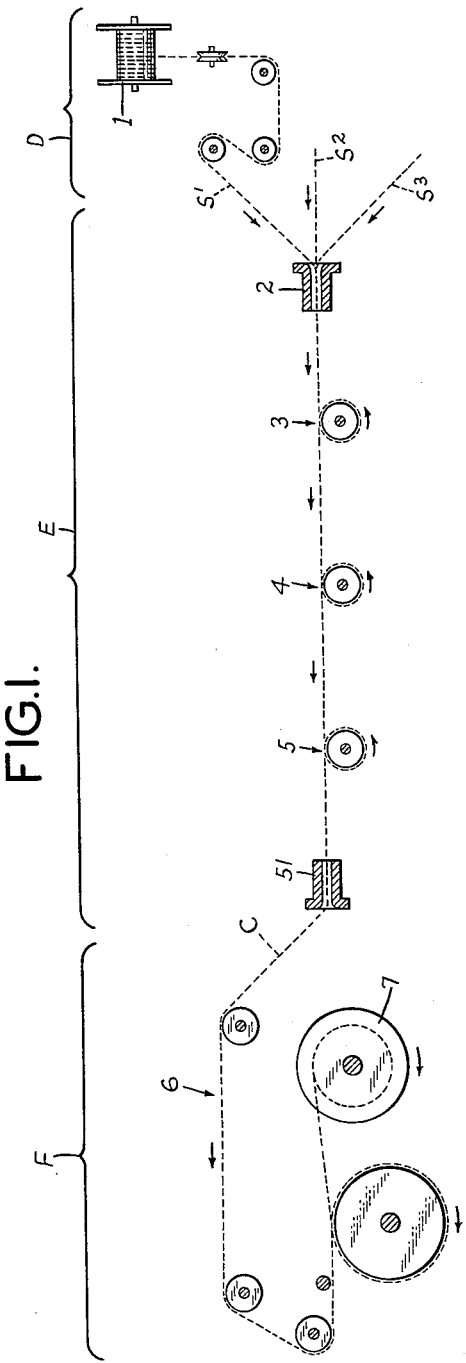
FIG.1A.
FIG.1B.
FIG.1C.
INVENTORS
GABRIEL XAVIER ROGER BOUSSU
LOUIS PIERRE FRANCOIS ANDRE NEUVILLE
LOUIS HENRI NOEL SAINT-FRISON
BY
THEIR ATTORNEYS May 21, 1963    G. X. R. BOUSSU ETAL    3,090,189
ELASTIC WIRE CABLES
Filed Oct. 30, 1957    7 Sheets-Sheet 2
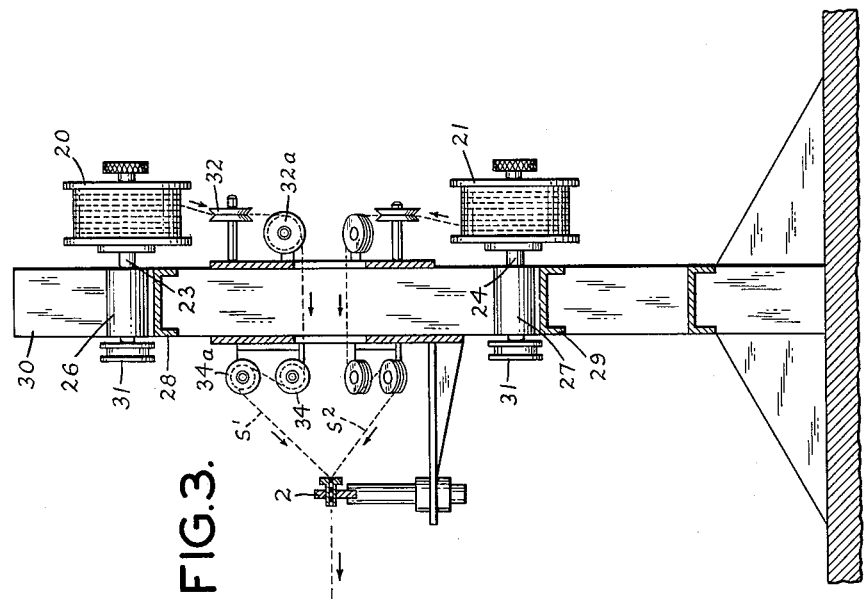
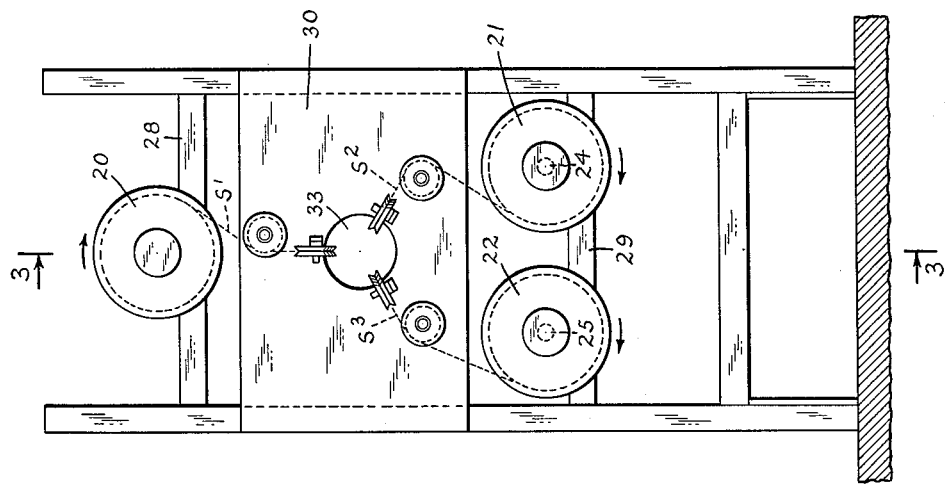
INVENTORS
GABRIEL XAVIER ROGER BOUSSU
LOUIS PIERRE FRANCOIS ANDRE NEUVILLE
LOUIS HENRI NOEL SAINT-FRISON
BY
THEIR ATTORNEYS

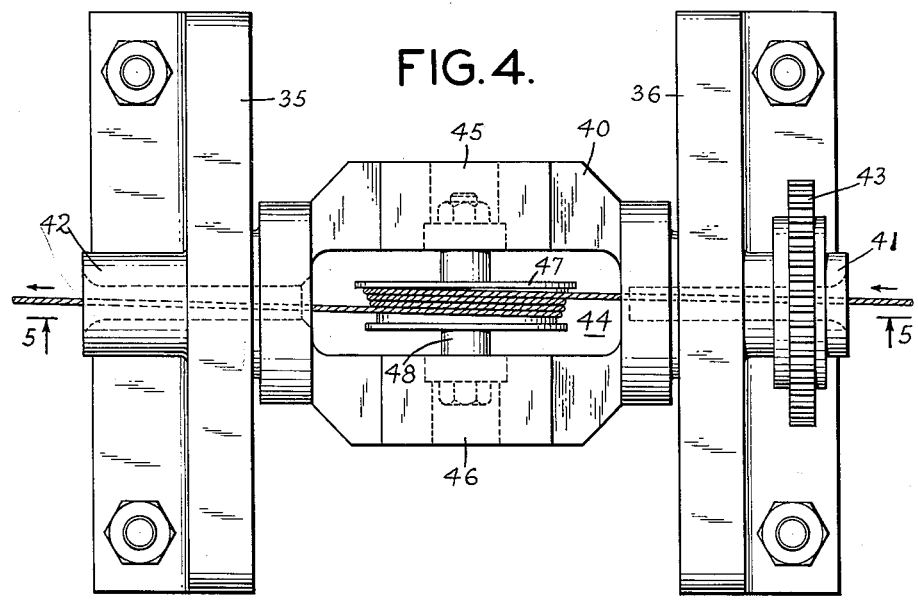
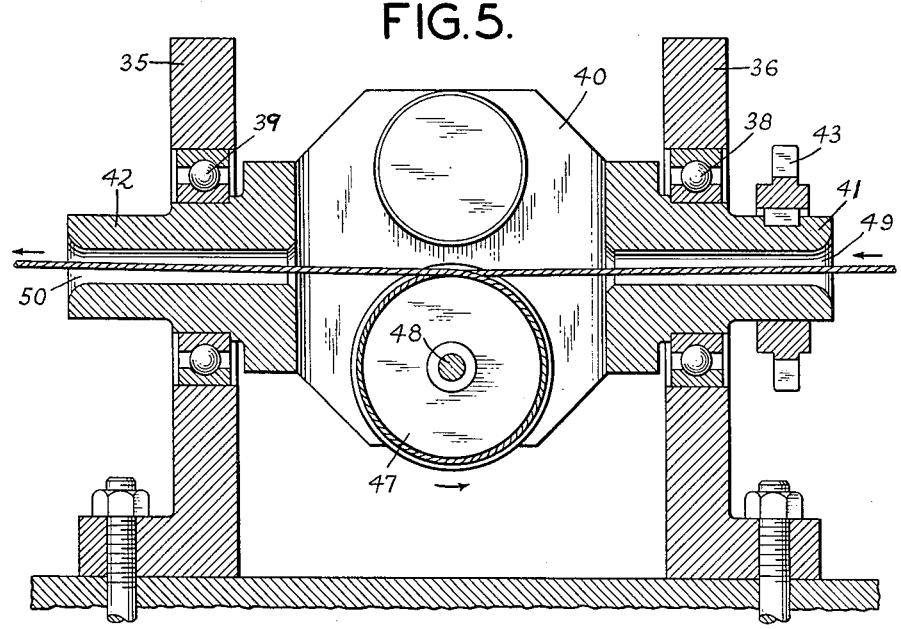

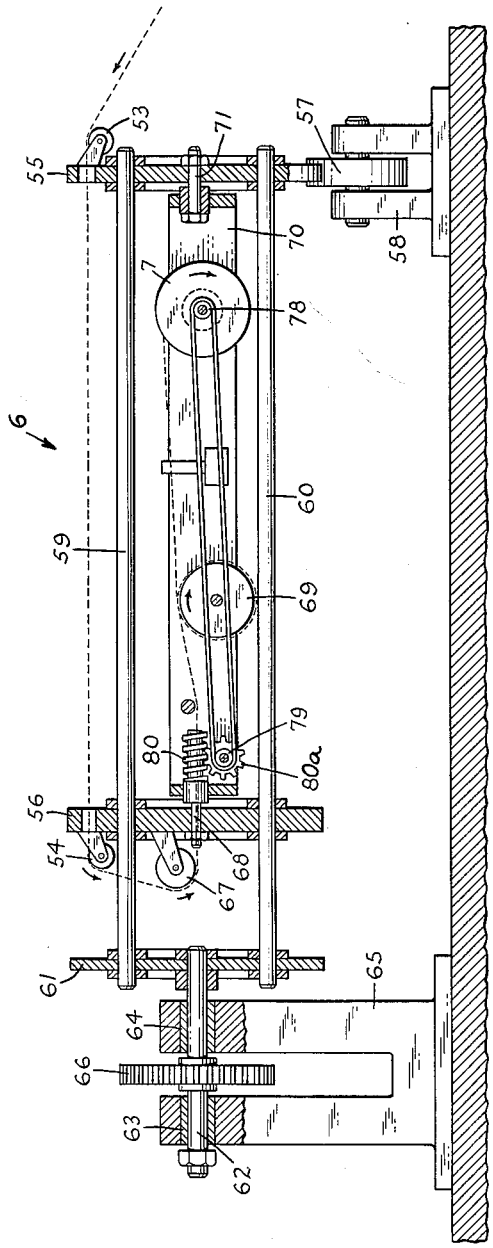

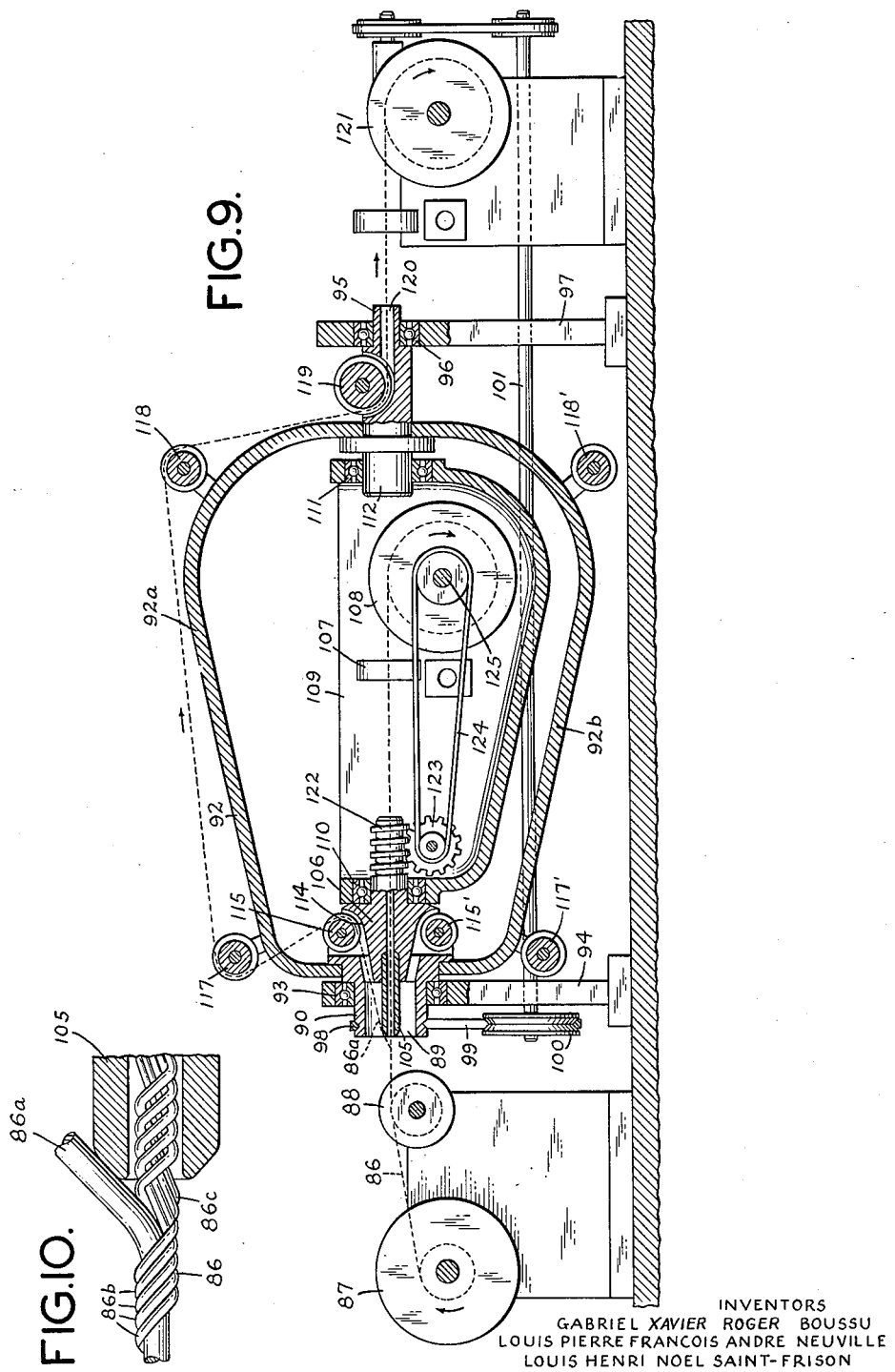

3,090,189
ELASTIC WIRE CABLES
Gabriel Xavier Roger Boussu, Chamalieres, and Louis Pierre Francois Andre Neuville and Louis Henri Noel Saint-Frison, Clermont-Ferrand, France, assignors to Michelin & Cie, Clermont-Ferrand, France
Filed Oct. 30, 1957, Ser. No. 693,457
Claims priority, application France Mar. 30, 1957
8 Claims. (Cl. 57—139)

This invention relates to improvements in metallic cables and it relates more particularly to the manufacture of elastic or extensible cables which are especially adapted for use in the reinforcement of tires or tire casings, transmission and conveyor belts and the like.

Production of tires or tire casings containing metallic wire or metallic cable reinforcing elements in the sidewall and/or tread portions has become rather general because of advantages afforded by the use of such metallic cables instead of or in conjunction with the textile fabric cords or plies used heretofore in tires. Metallic cables impart much greater strength to the tires while at the same time enabling the number of plies therein to be materially reduced thereby increasing the flexibility and durability of the tires. Moreover, cable-reinforced tires have increased resistance to damage by cutting or breaking of the plies, or other causes. On the other hand, steel wires or cables used heretofore in the tires leave something to be desired because, for the most part, they resist elongation, in many instances, not exceeding two and one half percent elongation at rupture under tensile stress. Such relatively inextensible cables do not transmit and distribute stress uniformly, or impart optimum flexibility to the plies of the tire. Stiff tires have uncomfortable riding properties and also are more susceptible to damage by sharp edged rocks and the like.

The present invention relates to flexible and extensible cables which are especially adapted for use in tires, tire casings, power transmission belts, conveyor belts and the like.

More particularly, the present invention relates to cables which are capable of being stretched substantially without rupturing under tension stresses. Elastic cables embodying the present invention are highly resistant to damage by impact or cutting; and, moreover, they may be bonded readily to rubber layers or carcass plies of tires or the casings. The resiliency of the cables enables tires to be made with highly flexible sidewalls which have exceptionally comfortable riding qualities.

Cables according to the present invention may be divided generally into three classes: (A) Coreless cables made of a single layer of multiple wire strands which are given a permanent helical form; (B) Coreless cables which have been formed around a core initially but from which the core has been extracted; (C) Cables having a single layer of wires or strands which have been given a permanent helical set arranged with provision for play or movement around an extensible core formed, for example, of cotton or a synthetic fibre such as "nylon" or "rayon" or another extensible metallic cable.

In general, cables of type "A" may be formed by twisting a plurality of strands of wire made up of one or more wire filaments and then further twisting the strands to give them a permanent set. Thereafter, the cable is partially untwisted to remove part of the set from the strands and to associate them in a less tightly twisted relation hereby permitting limited relative movement between the strands. Also type "A" cables can be made by assembling a desired number of strands to the desired pitch for the finished cord without exceeding its elastic limit so that the assembly of strands is springy and tends to unwind as far as possible. The assembly is then twisted a number of turns substantially equal to the number of turns which the cord can unwind by its natural torsion action. Thereafter, the cord is untwisted by a number of turns so as to relieve a part of the set of the strands of the cable and thereby leave the strands free for limited relative movement with respect to each other.

Type "B" cables can be made by twisting a plurality of wires or strands made up of a plurality of wires around a cable or core while leaving a space between the strands about equal to the dimension of the core. The strands are twisted so as to set the cable in its desired form and then the cable is untwisted partially to shift the strands outwardly from the core thereby enabling the core to be extracted from the cable through the space purposely left between the strands. Removal of the core leaves the strands of the cable relatively loosely associated and free to move, thereby rendering the cable stretchable and elastic.

Type "C" cables are produced by winding a plurality of wires or multiple wire strands around an elastic core, twisting the strands to give them a permanent helical shape, and then untwisting the cable partially to provide for play or clearance between the core and the layer of wire or strands of wire. A type "A" cable may be used as a core for a type "C" cable, if desired.

The modulus of elasticity and tensile strength of the new cables can be regulated by proper selection of the wires forming the cables and their characteristics otherwise modified by the manner or extent of twisting during formation so that they can be made to withstand widely varying service conditions.

Inasmuch as the strands of the cables are relatively loosely associated, the rubber of tire plies can penetrate into the cables and form a strong mechanical bond to the cables. Moreover, the elasticity of the new cables renders them considerably more resistant to cutting than non-elastic cables having the same cross-section and made up of the same number of wires of the same physical characteristics so that they are particularly satisfactory for use between the triangulated reinforcement of the tread zone and the flexible sidewalls of tire casings of the type shown in the Bourdon patent, No. 2,493,614 or the Bourdon application Serial No. 140,823, filed January 27, 1950, now Patent No. 2,811,998, as well as in other types of tires or tire casings.

Power transmitting belts, conveyors or the like containing the new cables can be made flatter, can be molded more readily and the inherent resiliency or extensibilty of the cable affords a more uniform distribution of stresses throughout the belts.

For a better understanding of the present invention, reference may be had to the accompanying drawings in which:

FIGURE 1 is a schematic illustration of an apparatus suitable for manufacturing cables of the type embodying the present invention;

FIGURES 1A, 1B and 1C are side elevational views of a cable in various stages of its preparation in accordance with the invention;

FIGURE 2 is an end elevational view of an apparatus for supplying wires or strands to the twisting apparatus;

FIGURE 3 is a view in section taken on line 3—3 of FIGURE 2;

FIGURE 4 is a plan view of a mechanism for twisting a cable;

FIGURE 5 is a view in section taken on line 5—5 of FIGURE 4;

FIGURE 6 is a view partially in longitudinal section and partially in side elevation of a reeling and twisting mechanism forming a part of the cable making machine;

FIGURE 9 is a view partly in section and partially in side elevation of an apparatus for removing a core from a modified type of cable;

FIGURE 10 is an enlarged view of a detail illustrating the removal of the core from a partially completed cable;

Figure 8:
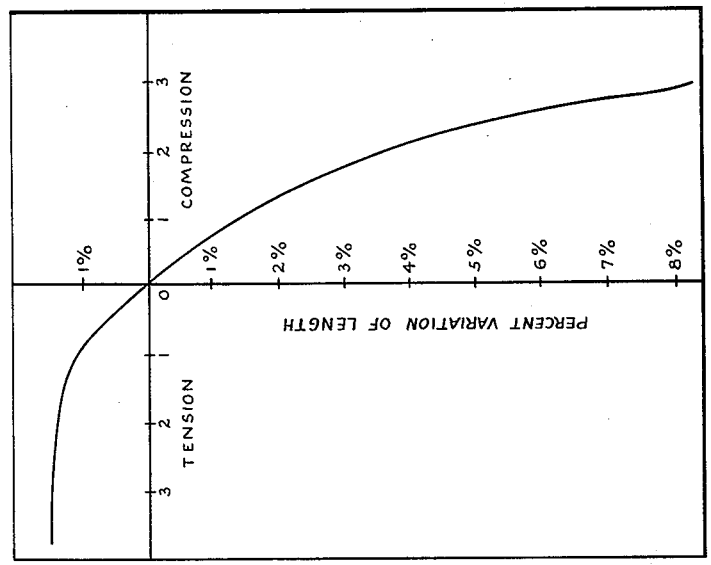
FIGURE 8 is a graph showing a curve of deformation by axial compression of an elastic cable of the type embodying the invention.

A suitable type of apparatus for making a cable embodying the present invention is illustrated diagrammatically in FIGURE 1 of the drawing. As shown therein, D is a strand feeding mechanism in which a plurality of metallic strands formed of one or more metallic filaments or wires are supplied from a plurality of reels 1 and so forth, over a pulley system to a bushing or guide 2 where the strands S1, S2, S3 and so forth, are brought into side by side relation and fed to a series of twisting capstans 3, 4 and 5 in the twisting section E of the apparatus where the strands are twisted by capstan 3, further twisted by the capstan 4 and then partially untwisted by the twisting capstan 5. The partially untwisted and thus somewhat loosened and elastic cable C issuing from the last twisting section 5 then passes into section F of the machine which includes rotating receiving device 6 receiving the cable C leaving the twister 5 and winding it on a receiving spool 7.

In the operation of the device, the first twister 3 turns in one direction to give the assembly of strands S1, S2, S3 a twisting pitch equal to between 20 and 100 times the diameter of the wire making up the strands and usually from 30 to 50 times the diameter of the wire. After twisting in the twister 3, the cable passes to the twister 4 which turns in the same direction as the twister 3 but at a higher speed where the cable is given an additional twist. The cable then passes to the twister 5 which turns at a lower rate than the twister 4 and in the same direction so that the wire is partially untwisted when moving from the twister 4 to the twister 5 and sufficient play is introduced between the strands to impart the desired elasticity or stretch to the cable. The amount of play should be between about ¼ and ½₀ of the diameter of the individual strands making up the finished cable.

As the cable leaves the twister 5, it is stabilized and has only a slight tendency to wind or unwind and accordingly the receiving device 6 of the twisting machine is operated to untwist the cord somewhat and thereby completely stabilize it against further winding or unwinding by itself.

FIGURES 2 to 6 illustrate in greater detail the structure of the various elements of the cable-forming machine. As shown in FIGURES 2 and 3, the feeding section D for the strands S1, S2 and S3 include a series of spools or reels 20, 21 and 22 on which are wound the strands made up of one or more wires to be formed into the cable. Moreover, more than the three strands S1, S2 and S3 shown may be supplied by the supply device as may be required. Thus, four, five or more spools may be mounted in such a manner as to supply the various strands to the bushing or guide 2 of the apparatus. It will be seen from FIGURE 3 that the spools 20, 21 and 22 are mounted on shafts 23, 24, 25 which are rotatably mounted in suitable bushings or bearings 26, 27 fixed to crosspieces 28 and 29 on a supporting frame 30. Each of the shafts 23, 24 and 25 has a friction brake 31 thereon to adjust the tension of the strands. The strands are drawn off of each reel over similar systems of pulleys including pulleys 32, 32a which direct the strand through an opening 33 in the frame 30 and thence over the pulleys 34 and 34a which direct the strands inwardly at an angle into the bushing 2 in side by side relation. The supply device D reduces to a minimum the spiralling of the strands as a result of the twisting of the strands and thereby causes formation of a straight and pliable cable. Assembled strands S1, S2, S3 leaving the bushing 2 pass through the several twisting devices 3, 4 and 5 all of which are the same as the twister disclosed in FIGURES 4 and 5 of the drawing. A suitable type of twister may include a pair of frame members or uprights 35 and 36 having bearings 38 and 39 therein for receiving rotatably the twister frame 40. As best shown in FIGURE 5, the twister frame 40 has hollow shafts 41 and 42 at its opposite ends journaled in the bearings to enable the frame to be rotated about the axis of the shafts. A sprocket 43 is mounted on the shaft 41 for rotating the frame 40. Mounted in a slot 44 in the mid-portion of the twister frame 40 and between the side plates 45 and 46 of the twister frame is a capstan 47 which is supported for rotation on a shaft 48 which is mounted in suitable bearings in the side plates 45 and 46 of the frame. As shown in FIGURE 5, the partially twisted or assembly of strands is passed through the opening 49 in the shaft 41, is wrapped several times around the capstan 47 and then is passed out through the opening 50 in the shaft 42. Upon rotation of the capstan frame 40 by means of the sprocket 43, a predetermined number of turns can be inserted in the cable between the twister 3 and the bushing or guide 2 as shown in FIGURE 1A.

The twisters 4 and 5 are like the twisters shown in FIGURES 4 and 5 and they impart a desired twist to the cable during its formation. As shown in FIGURE 1B an additional number of turns or twists are introduced at the twister 4 while twister 5 partially untwists the strands S1, S2 and S3 as shown in FIGURE 1C.

The cable C issuing from the twister 5 passes through another guide member 51 into the receiving section F of the twisting machine which is disclosed in greater detail in FIGURE 6 of the drawing. Thus, the cable passes successively over guide rollers 53 and 54 mounted on frame or end plates 55 and 56 of a twisting and reeling frame. The end plate 55 is disc-like and its periphery engages a pair of idler rollers 57 mounted on frame member 58. The end plates 55 and 56 are connected by means of two pairs of rods 59, 60, thereby forming a generally cage-like frame which can be rotated bodily. A plate 61 connected to the left hand ends of the rods 59 and 60 has a shaft 62 thereon which extends through suitable bushings 63, 64 in the standard 65 and is rotatable relative thereto. A sprocket 66 fixed to the shaft 62 is driven by a chain or other mechanism to rotate the frame to twist, untwist or hold the cable C more or less static with respect to the twister 5. After passing over the roller 54, the cable C passes around another pulley or guide roller 67 and is fed axially through a tube 68 mounted in the mid-portion of the end plate 56 and around a capstan 69 which is journaled in a subframe 70 which is mounted for rotation on the tube 68 and a shaft 71 fixed to the end plate 55. The subframe 70 is counterbalanced to hold it level and against rotation with the end plates 55 and 56. After passing around the capstan 69, the cable is wound up on the receiving reel 7 which is journaled in the subframe 70 and is driven by means of a chain or belt which passes around a sprocket 78 fixed to the reel and a sprocket 79 which is driven by means of a worm and worm gear drive 80 and 80a. The worm 80 is fixed to and rotates with end plate 56 while the worm gear 80a is rotatably mounted in the frame 70. Other suitable drive mechanism for the take-up reel 7 may be provided to enable an appropriate tension to be applied to the cables and the strands from which the cable is made up thereby to properly tension and assure twisting of the strands under tension. The operation of the various components of the cable-making machine is controlled to impart the desired characteristics to the cable made therein.

With a machine of the type described, if for example, it is desired to make an elastic cable containing three strands, each strand containing seven wires of 0.15 millimeter diameter and impart a 4.5 millimeter pitch to the strands, the following twisting ratios can be used. If the frame of the winding and takeup device F is operated at N revolutions per minute, the twister 3 is rotated at 0.6 N revolutions per minute, the twister 4 at 2.9 N revolutions per minute and the twister 5 at 1.8 N revolutions per minute. In practice the winding and takeup device F is operated at between 800 and 1200 r.p.m. to produce a cable of the type described. The velocity of rotation is conditioned by the size of the receiving coil, the diameter of the cable, the number of strands, and the diameter of the wires constituting therein. It has been found that the cable is more elastic if the strands are stretched to a lesser degree. Accordingly, it is desirable in most instances to apply the brakes 31 on the supply reels 20, 21 and 22 only enough to avoid curling of the cable and to provide sufficient friction between the cable and the capstans of the twisting machines to prevent slippage.

In the above-described apparatus, the twister 3 gathers the strands and begins the twisting operation while the twister 4 finishes twisting. When making some kinds of cable, a single twister may be used instead of the twisters 3 and 4.

Figure 11:
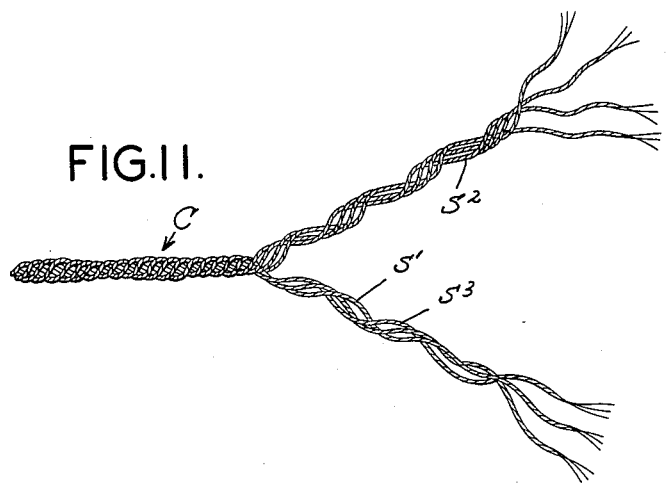
FIGURE 11 is a side elevational view of a cable embodying the present invention with a portion of the strands and wires thereof separated.

The cables produced as described above and as shown in FIGURE 11 are type "A" coreless cables composed of a single layer of strands each having a permanent helical shape. Such cables have a modulus of elasticity below 2000 (expressed in grams per square mm.) for tension stresses less than 10% of their rupture load, that is, less than one-tenth of the modulus of elasticity of the steel wires contained in the cable. The new cables also have an elongation or stretch at the breaking point of at least 6% and able to attain an elongation of 11½% or even more.

Due to the spacing between the strands of the cable, the cables have very little internal friction and a slight damping action and are highly resistant to cutting by sharp edged bodies.

It will be appreciated that by varying the twisting and untwisting of the strands, it is possible to vary the elasticity or stretchability of the cable and thereby to produce cables which are suitable for many different purposes.

Figure 7:
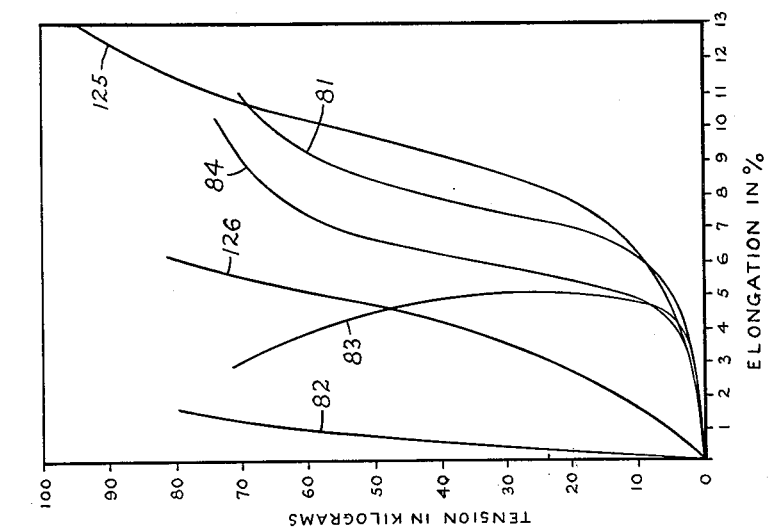
FIGURE 7 is a graph showing the tension curves of two types of elastic cables embodying the invention and of a non-elastic cable composed of the same number of wires with the same diameters and characteristics and also showing the elastic elongation curves and those of total elongation of typical cables embodying the invention.

FIGURE 7 discloses the characteristics of cables of a type embodying the present invention as compared with relatively non-elastic or non-stretchable cables made of a similar type of wire and having conventional characteristics and thus FIGURE 7 shows at 81 the tension curve of a three strand elastic cable in which each strand contains seven steel wires each having a diameter of 0.15 millimeter. The diameter of the cable is 1.08 millimeter, its tensile strength at breaking point is 73 kilograms and the pitch of the strands is 5 millimeters. The tensile strength of the individual wires is 250 kilograms per square millimeter.

FIGURE 7 also shows the tension curve of a seven strand non-elastic cable 82, each strand containing three wires 0.15 millimeter in diameter having a tensile strength of 250 kilograms per mm.². A comparison of the curves 81 and 82 shows that under 10 kilogram tension, the elastic cable stretches 39 times more than the non-elastic cable. Also, when tested under tension below 1/10 of the rupture load, the modulus of elasticity of the elastic cable is found to be much lower than the modulus of elasticity of the non-elastic cable. Table I further shows this comparison.

TABLE I

| Cord | Elongation 2,500 kg., percent | Under a 5 kg., percent | load of 10 kg., percent | Elongation at Rupture, percent |
|---|---|---|---|---|
| elastic | 3.4 | 5.3 | 6.3 | 11.5 |
| non-elastic | 0.04 | 0.08 | 0.16 | 1.5 |

FIGURE 7 also shows the elastic elongation curves 83 and total elongation 84 of a 3 strand elastic cable in which each of the strands contains seven wires each having a diameter of 0.15. These curves show high elastic elongation under slight load of the new elastic cables. In each of the cables corresponding to curves 83 and 84, the cable pitch is in the same direction as the pitch of the wires in the strands.

Tension tests on elastic cables embodying the present invention sheathed in vulcanized rubber show that elongation under load of the new rubber sheathed cables is greatly in excess of elongation of similar bare cables.

FIGURE 8 shows the deformation curve caused by an axial tension and compression of an elastic cable having the characteristics indicated by the curve 81 in FIGURE 7. The free axial length of the cable tested was 5 millimeters. The ability of the new cables to withstand compression without damage permits them to be used at certain zones of tires or tire casings where they are subjected to alternate compression and tension stresses.

Static cutting tests in which a knife edge is pressed under varying loads against a stretched cord resting on a very hard rubber block shows conclusively the superiority of the new cables with respect to resistance to cutting. Comparative tests are given in Table II.

TABLE II

| Tension of cable, kg. | Force to be applied to knife to sever the cable | | | |
|---|---|---|---|---|
| | Non-elastic cable 7 x 3 x 0.23 kg. | | Elastic cable 3 (1+6) 0.23 kg. | |
| 75 | Maximum | 175 | Maximum | 365 |
| | Mean | 163 | Mean | 327 |
| | Minimum | 145 | Minimum | 276 |
| 100 | Maximum | 90 | Maximum | 195 |
| | Mean | 65 | Mean | 178 |
| | Minimum | 50 | Minimum | 155 |

It will be seen that in every instance, the resistance to cutting of the new elastic cable is at least double that of the non-elastic cable. Dynamic cutting tests in which a tensioned cable is struck with a sharp-edged cutting member also show the new cable to be superior to prior cables. Table III shows the results of tests made on two cables containing the same number of wires, one of the cables being elastic and the other, non-elastic.

TABLE III

| Maximum deflection imposed on cable, mm. | Number of shocks necessary to break the cable | | | |
|---|---|---|---|---|
| | Non-elastic cable 7 x 3 x 0.23 | | Elastic cable 3 (1+6) 0.23 | |
| 12 | Maximum | 148 | Maximum | 266 |
| | Mean | 92 | Mean | 208 |
| | Minimum | 31 | Minimum | 136 |
| 20 | Maximum | 24 | Maximum | 68 |
| | Mean | 16 | Mean | 53 |
| | Minimum | 12 | Minimum | 41 |

Tests for resistance to cutting by shock with a Charpy pendulum on an elastic cable and on an non-elastic cable containing the same number of wires of the same diameter show that twice the amount of energy is needed to cut the elastic cord by shock as that required to cut the non-elastic cable.

Table IV discloses a comparative test on a similar cable and a non-elastic cable.

TABLE IV

| Cord tested for shock | Energy for rupture T, kgm. | Weight per meter p, g. | Quotient T/p |
|---|---|---|---|
| 3 (1+6) 0.23 elastic | 0.824 | 7.5 | 0.110 |
| 7 x 3 x 0.23 non-elastic | 0.365 | 6.6 | 0.055 |

An elastic cable made up of three strands containing seven wires, 0.15 millimeter in diameter is much more resistant to bending than non-elastic cables containing seven strands, each made up of three wires of the same size and kind. Fatigue tests show that the elastic cable contained no broken wires after 200,000 bends while 25% of the wires of the non-elastic cable were broken after 100,000 bends.

Figure 12:
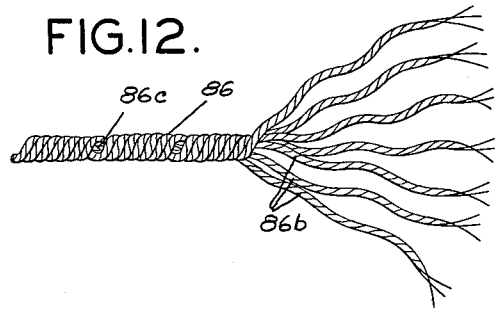
FIGURE 12 is a side elevational view of a modified type of cable embodying the invention with a portion of the strands and wires thereof separated.

Type "B" coreless hollow cables shown in FIGURES 10 and 12 which are produced by the removal of a forming core from a cable after twisting have characteristics similar to the type "A" cables. An apparatus for removing the core from a cable to make type "B" cables is disclosed in FIGURE 9 of the drawing. Prior to the treatment in the apparatus of FIGURE 9, a cable is pre-formed by twisting a plurality of strands around a core of a sufficiently large diameter so that the strands do not entirely cover it. The cable 86 thus obtained is wound on a reel 87 and then is ready for treatment in the machine shown in FIGURE 9. The cable 86 leaves the reel 87 and passes around a capstan 88 into the opening 89 in the sleeve 90 which supports one end of the frame 92 having outwardly bowed frame bars 92a and 92b. A bearing 93 in the upright 94 receives the sleeve 90 rotatably. The frame 92 is also supported at its opposite end by a shaft 95 which is rotatably mounted in a bearing 96 in a standard or upright 97. A pulley groove 98 is formed on the shaft 90 and the pulley may in turn be driven by means of a belt 99 and a drive pulley 100 on a drive shaft 101 to rotate the frame 92 bodily. In passing through hollow shaft 90, the cable is directed through a separating tube 105 and through a hollow shaft or spindle 106 into a guide 107 which directs the cable to a take-up reel 108 carried in a pendulous subframe 109 mounted within the frame 92. The subframe 109 is supported on bearings 110 and 111 mounted on the spindle 106 and a stub shaft 112 extending inwardly from the frame 92 and is suitably counter-weighted in order to prevent its rotation as the frame 92 rotates around it.

Rotation of the frame 92 is used to strip the core 86a from the cable 86 as shown best in FIGURE 10 of the drawing. The cable 86 (FIGURES 10 and 12) is made up of a plurality of substantially parallel helical strands 86b wound around the core 86a in side-by-side relation in such a way that a gap 86c is left between certain of the strands 86b so that the core 86a can be withdrawn through the gap to form a hollow sheath. The method of winding strands 86b around core 86a is the same as for the type "A" cable and the equipment used therefor is also the same. It is only necessary to select the proper number of strands to leave around the core a total free space at least equal to the diameter of the core. When the core is extracted, one end of the core 86a passes through a passage 114 in the spindle 106 and around a pulley 115 carried on the spindle 106, outwardly past the arm 92a of the frame, around the pulleys 117, 118 rotatably mounted on the outside of the frame 92, around the pulley 119 and outwardly through an opening 120 along the axis of the spindle 95 to the take-up reel 121. It will be seen that the core 86a is spun around the cable as it is withdrawn and by properly timing the speed of rotation of the frame 92 to the pitch of the strands 86b of the cable, the core 86a can be stripped out of or removed from the cable 86. A suitable drive mechanism may be provided for the take-up reel 108. For example, it can be driven by means of the worm 122 on the spindle 106 which rotates with the frame 92 and the worm gear 123 rotatably mounted on the subframe 109 and connected by means of a chain or belt drive 124 to the shaft 125 of the take-up reel 108. If desired, suitable friction couplings may be interposed in the drive for the take-up reels 108 and 121 so that they wind up the cable and the core respectively at the same rate as the core is stripped from the cable.

The extra pulleys 115', 117', 118', etc. disclosed in FIGURE 9 serve as counterbalances and, of course, may be replaced by other counterbalancing means.

Type "B" cables produced with the apparatus shown in FIGURES 9 and 10 can be encased in rubber more perfectly than the coreless cables produced by the apparatus shown in FIGURE 1 inasmuch as they have a wide central opening which the rubber can fill as well as the opening 86c which extends helically along the cable. These cables are unwindable and they are highly flexible and are very durable under repeated deformation. The number of the metal strands or wires which the cables are made up can be varied widely. Thus, one form of cable may include six to eighteen steel wires at a pitch of 20 to 100 times the diameter of the wire. A typical elastic cable is formed of twelve 0.15 millimeter wires arranged at a 4 millimeter pitch.

Other type "B" cables may be formed of 4 to 12 strands of 3 to 4 wires at a pitch of 20 to 100 times the diameter of the strands. For example, an elastic cable may be formed of eight strands of four 0.15 millimeter wires at a 6 to 7 millimeter pitch.

Another cable may be made up of 5 to 12 strands of seven steel wires per strand. For example, a cable may be composed of six strands, each strand containing seven wires 0.15 millimeter in diameter and with a pitch of 6 to 7 millimeters.

The elasticity of such cables is indicated in the following tables.

TABLE V

| Elastic cable consisting of twelve 0.15 wires | Percent Elongation of the bare cable under load | | | | |
|---|---|---|---|---|---|
| Tension force in kg | 0.500 | 1 | 2 | 5 | 10 |
| Elongation, percent | 0.7 | 1.1 | 1.4 | 2.1 | 2.3 |

TABLE VI

| Elastic cable consisting of twelve 0.15 wires | Percent Elongation under load of cable embedded in rubber | | | | |
|---|---|---|---|---|---|
| Tension force in kg | 0.500 | 1 | 2 | 5 | 10 |
| Elongation, percint | 0.3 | 0.5 | 0.96 | 2 | |

TABLE VII

| Elastic cable consisting of six strands of seven 0.15 wires | Percent Elongation of the bare cable under load | | | |
|---|---|---|---|---|
| Tension force in kg | 10 | 20 | 50 | 100 |
| Elongation, percent | 1.15 | 1.50 | 2.7 | 4.12 |

Cables of the type disclosed in the preceding tables have a much greater elongation under load than cables manufactured according to the processes currently in use. This result is achieved by omission or removal of the core and by the small pitch of the cable. When such a cable is subjected to tension, the pitch of the helices formed by the strands elongates by reduction in diameter of the cylinder on which the helices are formed. It is observed that reduction of the diameter of the cylinder for a given extension of pitch is proportional to pitch and shorter pitches cause a smaller decrease in diameter of the center core hole of the cable. In a tire, this central hole contains rubber and by exerting tension on the cable, the rubber is compressed and this increases the modulus of the cable. These cables also are extremely flexible because of very low internal friction.

Figure 13:
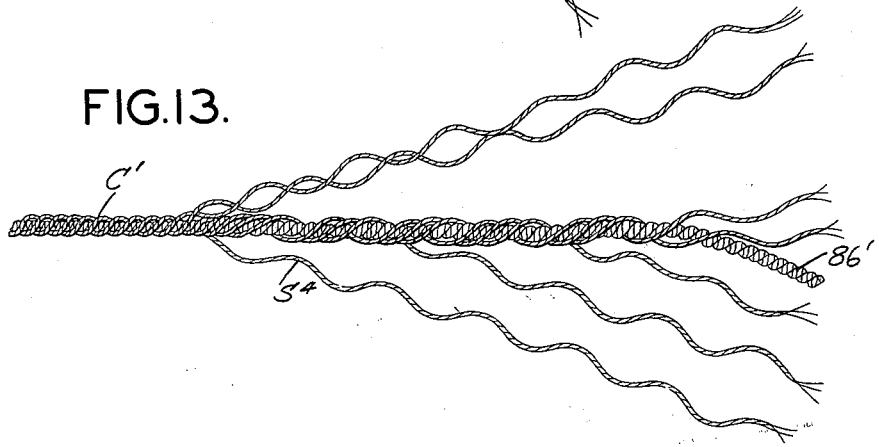
FIGURE 13 is a side elevational view of another type of cable embodying the invention with a portion of the strands and wires thereof separated.

Type "C" elastic cables C' as shown in FIGURE 13 may contain as a core an elastic cable 86' for example like that shown in FIGURES 10 and 12 and containing 12 coreless strands. Seven helical strands S4 each made up of 3 wires of the same diameter are wound around the core at a pitch a little less than the pitch of the 12 wires in the coreless cable to produce a new elastic cable in which the core is highly extensible. This type of cable can be made with a machine of the type shown in FIGURES 1 to 6 in which an extra spool is provided for feeding the pre-formed core into the center of the strands and the play or spacing between strands obtained by suitably twisting the strands and partially untwisting the cable. During formation of the cable, the core undergoes twisting and untwisting like the wires or strands disposed around it, but this is of no importance because the core is composed of stretchable and compressible textile material.

Other type "C" elastic cables can be made in accordance with this invention. For example, fifteen 0.15 millimeter steel wires are wound helically at a pitch of 5 millimeters to the left around a cotton core. Wire is used having a tensile strength of 260 to 270 kg./mm.$^2$. The core is a cotton cord containing three strands each consisting of four metric No. 30 threads. The rupture strength of the cord is 8.69 kg., its diameter is 0.8 mm. and its elongation at breaking is 16%. The resulting cable has an elongation of 3% at 1 kg. tension, a rupture load of 55 kg. and elongation at breaking point of 12 to 13%.

Similar cables can be made utilizing rayon or nylon cores.

FIGURE 7 discloses at 125 the elongation curve under load of a cable of the type described immediately above and at 126 the elongation curve of a similar cable after it has been embedded and vulcanized in rubber. Upon comparison it will be clear that the bare cable has great stretch or elasticity. As much as 12% stretch at breaking point is easily obtained; it has excellent elastic properties under light load, satisfactory resistance to axial compression, great porosity, very light internal friction and only slight damping action.

From the preceding description of typical methods and apparatus for producing the new elastic or extensible cables and from the typical examples of such cables given herein, it will be understood that the cables are susceptible to considerable variation in the arrangement of the strands or wires therein and in their characteristics such as diameter and composition of the wires and the formation and structure of the cores of the cables, when present. Moreover, the apparatus for forming the cables is susceptible to considerable modification and accordingly, the forms of the invention described herein should be considered as illustrative and not as limiting the scope of the following claims:

We claim:
1. A cable comprising a plurality of helical twisted strands of wire, each of said strands having a permanent set elastically opposing any change in its helical shape, and said strands being loosely twisted together to enable said strands to move toward and away from each other when subjected to tension lengthwise thereof, said strands being in side-by-side relation and forming a hollow sheath.

2. The cable set forth in claim 1 in which said strands have at least one helical gap therebetween extending lengthwise of said cable.

3. A cable comprising a plurality of strands, each formed of a plurality of twisted metallic wires, said strands each being bent into a helix and having a permanent set elastically opposing any change in its shape, said strands being loosely assembled in twisted relation and forming a hollow sheath with capacity for limited relative movement inwardly and outwardly to enable the assembled strands to stretch at least 6% at the breaking point.

4. The cable set forth in claim 3 in which the wires and strands are twisted at a pitch between about 20 and 100 times the diameter of said wires.

5. The cable set forth in claim 4 in which the capacity for relative movement of the strands is between about one-fourth and one-twentieth of the diameter of said wires.

6. The cable set forth in claim 3 in which the strands are in side-by-side substantially parallel relation, said strands being spaced apart slightly to form at least one substantially helical gap between them.

7. Metal cable for reinforcing articles comprising a plurality of twisted wire strands twisted around each other and forming a hollow sheath, each strand containing at least one wire having a tensile strength of at least 200 kg./mm.$^2$, each of said strands being permanently set in the form of a helix and loosely twisted with other strands to render them capable of relative movement in an amount equal to between about $\frac{1}{4}$ and $\frac{1}{20}$ of the diameter of said strands, said cable having an elongation of at least 6% when subjected to breaking stress and a modulus of elasticity of less than $\frac{1}{10}$ of the modulus of elasticity of the wire when subjected to a tensile stress less than $\frac{1}{10}$ of the breaking stress.

8. A cable according to claim 7, in which the strands are single wires.

References Cited in the file of this patent

UNITED STATES PATENTS

| | | |
|---|---|---|
| Re: 7,063 | Preston | Apr. 18, 1876 |
| 16,858 | Wood | Mar. 17, 1857 |
| 1,695,595 | Larned | Dec. 18, 1928 |
| 1,700,170 | Larned | Jan. 29, 1929 |
| 2,055,948 | Selquist | Sept. 29, 1936 |
| 2,101,003 | Fox | Nov. 30, 1937 |
| 2,365,661 | Winslow | Dec. 19, 1944 |
| 2,387,320 | Foster | Oct. 23, 1945 |
| 2,387,321 | Haddad | Oct. 23, 1945 |
| 2,448,782 | Davis | Sept. 7, 1948 |
| 2,457,631 | Bennett | Dec. 28, 1948 |
| 2,598,033 | Bourdon | May 27, 1952 |
| 2,691,864 | Delp | Oct. 19, 1954 |
| 2,763,979 | Swanson | Sept. 25, 1956 |
| 2,836,012 | Moorhouse et al. | May 27, 1958 |
| 2,882,674 | Lenk | Apr. 21, 1959 |

FOREIGN PATENTS

| | | |
|---|---|---|
| 208,207 | Great Britain | Dec. 10, 1923 |